Figure 1:
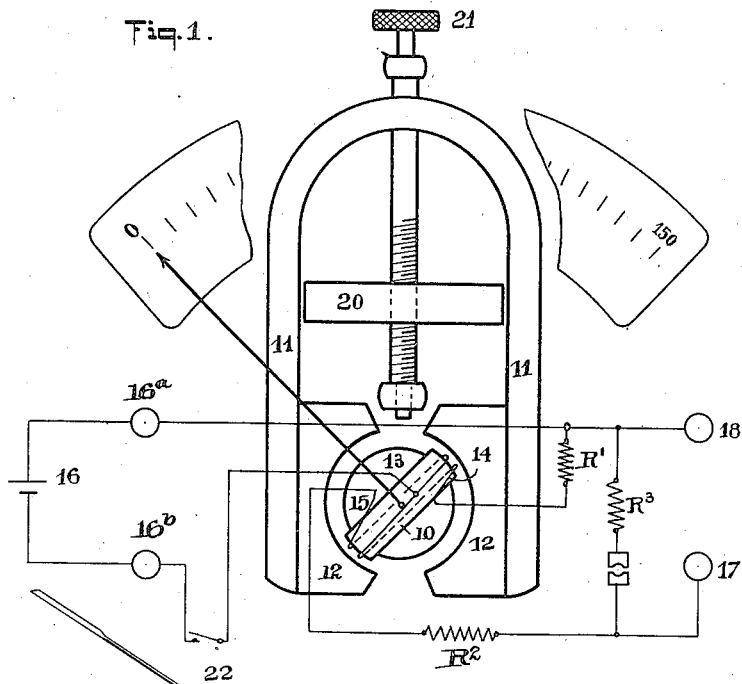

B. P. ROMAIN.
OHMMETER.
APPLICATION FILED OCT. 3, 1914.

1,215,867.

Patented Feb. 13, 1917.

WITNESSES
L. F. Browning
Alfred W. Proctor

INVENTOR
Burchard P. Romain
BY Edward E. Davidson
ATTORNEY

UNITED STATES PATENT OFFICE.

BURCHARD P. ROMAIN, OF SOUTH ORANGE, NEW JERSEY, ASSIGNOR TO WESTON ELECTRICAL INSTRUMENT COMPANY, OF NEWARK, NEW JERSEY, A CORPORATION OF NEW JERSEY.

OHMMETER.

1,215,867.     Specification of Letters Patent.      Patented Feb. 13, 1917.

Application filed October 3, 1914. Serial No. 864,797.

*To all whom it may concern:*

Be it known that I, BURCHARD P. ROMAIN, a citizen of the United States of America, residing in South Orange, county of Essex, State of New Jersey, have invented a certain new and useful Improvement in Ohmmeters, of which the following is a specification.

This invention relates to an ohmmeter adapted to correctly measure resistances in ohms by the movement of a pointer on a scale.

The principal object of the invention is to obtain a direct reading ohmmeter which shall be accurate in its readings notwithstanding the use of an ordinary battery as a source of electric current.

A further object is to provide an instrument having deflections which can be conveniently read on an ordinary scale, throughout a considerable range of resistance to be measured.

The ohmmeter of the present application is distinguished from all others by many important respects, and has a variety of features of use, or new results by which its action is distinguished. Its construction is generally illustrated in diagrammatic form in the drawings in which Figure 1 is an illustrative view showing the features and circuits of an instrument embodying the present invention, Fig. 2 is a detail view of the movable coil.

Constructions embodying the invention will include a movable coil or coils located in a suitable magnetic field, when the instrument is in use, tending to move, if a measurable resistance is connected across the measuring terminals, to a new position, but opposed in such movement by a yielding device, as a spring. In a convenient practical form the movable coil will be carried on pivots so as to turn on the axis thereof, and will be constrained to assume a certain position by the action of spiral springs S S' S" of the usual form used in measuring instruments of the classes heretofore mentioned. This position, in the best constructions embodying the invention, will be a free spring poised position, *i. e.* a position not fixed by any stop, but merely fixed by the complete relaxation of the springs.

Figure 2:
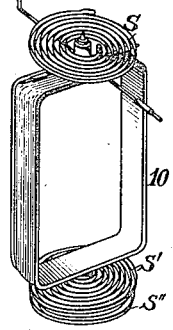

In the practical illustration of Fig. 1 the magnetic field in which the coil 10 is poised has lines of force passing through the coil, supplied in this case by a single permanent magnet 11. This permanent magnet may be of the usual form employed in instruments of this class. That is to say, it may have curved pole pieces 12 coöperating with a cylindrical stationary core 13 inside the movable coil 10.

The magnet will, however, in the best constructions, have a magnetic shunt or equivalent device, for example as hereinafter pointed out.

Constructions embodying the invention will therefore have (first), the movable coil or coils 10, compound wound, at least in effect, with two separate circuits 14 and 15, (second), the two separate circuits will form a divided path for the current from a battery 16, (third), each branch will either include or embody a certain resistance, (fourth) their magnetic effects will oppose one another, and (fifth), one branch will have a gap established by two binding posts or terminals 17, 18, which are adapted to be spanned by any resistance to be measured. The circuits may be completed through the spiral springs S S' S" which control the movable system, or equivalent means common in the art.

In the best practical constructions embodying the invention the resistance and ampere turns of each branch are of such magnitude, and the ampere turns in such direction, as to exactly equal one another and completely neutralize the effect of one another, when zero resistance, or in other words a dead short circuit is placed across the measuring terminals or binding posts 17, 18. To accomplish this the resistances of the branches may be properly related in themselves, or preferably supplemented by outside resistances $R^1$ and $R^2$ in series with the respective branches. Under these conditions, the coil has no magnetic effect as a whole, or in other words resultant torque tending to move it in any direction, and it will simply remain at its original position as determined by the springs. This position is the zero position and it forms an indication that the conductor bridging the terminals or binding posts 17, 18, has zero resistance.

With the arrangement just described, however, the insertion of any measurable resistance across the terminals or binding posts 17, 18, will produce an unbalancing of the magnetic effect of the two branches of the movable coil 10, so that a resultant magnetic effect is now created, tending to displace the coil 10, which moves a greater or less distance, proportionate to the strength of such resultant magnetic effect in the coil.

It will be evident, as to this instrument, that zero ohms or a short circuit across the terminals produces zero resultant magnetic torque in the movable system, so that any error in the battery E. M. F. is not imposed at all on the reading. In fact the battery may have any strength whatever up to the point where it endangers burning out the instrument, and still the pointer will stay on zero when zero resistance is being measured. This is at it should be, and corresponds to the important practical requirement that at the zero or low ohmic readings, any errors due to the battery should not have a substantially larger percentage effect than at higher readings. In other words, if the battery is say one per cent. away from its supposed condition during a test, the error in none of the ohmic readings will be substantially more than one per cent., whether they are high or low in magnitude. This is a satisfactory practical condition and is to be sharply distinguished from a condition where nothing is known of the error resulting from a battery variation, except that such error may be anything from nothing to 100 per cent., or any thing else. This advantage should not be lost sight of, and is of great practical importance.

It will secondly be observed that the instrument has a free zero position of the pointer, that is to say, a freely spring poised position whenever the key which disconnects the battery is opened. In this case the pointer merely swings to its freely spring poised position representing zero on the scale. Thus the pointer not only does not bang against the stop at this time, which is of considerable importance, but also the user has a check or test, which is always present, to see if the movable system is in good condition, by merely noting whether the pointer comes properly to the zero reading. Any of the usual devices employed in electrical measuring instruments such as voltmeters, etc., for adjusting the controlling springs can of course be used and manipulated, thereby re-adjusting the instrument to an exactly correct condition before any test, if it should be out of adjustment.

Thirdly, it will be seen that the instrument when properly designed has a fairly uniform scale, without any large portion being taken up by uselessly high or infinity readings. This effect is obtained by so proportioning the two circuits, of which the two branches of the movable coil form parts, that with infinite resistance across binding parts 17 and 18 the pointer will tend to deflect considerably beyond the top mark of the scale, say, by the amount of two or three scale lengths, i. e. 180° to 270°.

The fact, just noted above, that the user has a test or check on the accuracy of the instrument at the zero readings of the scale corresponding to the zero ohmic resistances to be measured, is supplemented by the fact that in accordance with the present invention a test has been provided for the instrument at its upper limit of measurement, i. e. for the highest ohmic resistances measured. The upper limit test consists of a definite and known resistance $R_3$ forming part of the instrument which may be plugged into a branch 15 of the moving coil 10, this being the branch which is designed to otherwise include the resistance to be measured. When this test resistance is plugged into the circuit the needle moves to a predetermined mark, for example, the top mark on the scale, or by failing to do so shows that the battery furnishing the fixed electromotive force required is not giving such proper voltage. Inasmuch as the drop of voltage has a directly proportionate effect on the current, it follows that such variation, or variation in the battery E. M. F. may be accurately compensated for by a magnetic shunt. This magnetic shunt may be of the usual form employed in voltmeters and ammeters. In the drawings a simple soft iron armature 20 is guided between the legs of the permanent magnet 11, and adjusted by a thumb screw 21. This armature should normally have a mean position, so that a battery voltage which is slightly too low or slightly too high may both be corrected for.

The convenience of the instrument is manifest in the fact that when zero resistance or a dead short circuit has been inserted between the terminals 17, 18, and the battery connected across the terminals $16^a$ and $16^b$ and the key 22 depressed, or equivalent plug inserted to close the battery circuit, there is absolutely no movement of the pointer, showing in the most convenient way that the resistance is zero, just as the movement of the pointer is zero. Moreover, the fact that the pointer has no movement is to be contrasted with the violent oscillation which would be given under such a condition, for example, with an instrument like that noted in the preamble to the specification.

The various detail features which result in the securing of each and all of the above advantages, in their totality, need not always all be included in instruments embodying the invention. For example, instead of having the freely poised position of the movable system accord to a zero reading on the scale, this freely poised position may be fixed at some other value on the scale, say 50 ohms or 100 ohms in an instrument designed to measure from 0 to 100 ohms. Under these conditions the coils will not be so related to one another in their resistances (including the resistances of their branches) and ampere turns, as to exactly balance one another when zero resistance is across the measuring terminals. On the contrary they will be unbalanced at this time but will be exactly balanced in their magnetic effect when the prescribed amount of 50 or 100 ohms is included across the measuring terminals. At this time their effects will be balanced, allowing the pointer to come to the freely poised position. On the other hand, when a greater resistance than the prescribed one is included across the measuring terminals the pointer will swing in the other direction and the instrument may be calibrated for measurement to any range desired. In fact the freely poised position of the pointer may be made any part of the scale, even at the highest measuring limit thereof. In this case the instrument forfeits a part of the advantages above referred to, which characterize my preferred form of ohmmeter, particularly in the fact that the percentage errors in the readings, resulting from battery E. M. F. variations, are not now substantially constant throughout the scale, corresponding to the percentage error in the battery. The instrument has the advantage of avoiding infinity readings for any portion of the scale, and simultaneously having a freely poised position of the pointer when the battery circuit is open, giving an opportunity for a test and also avoiding the banging of the pointer. Thus even this form of instrument has advantages over the prior types. These special forms which may be considered as incomplete or partial embodiments of the whole invention, are useful for special work, for example, in manufacturing electrical resistances it may be desirable to have an instrument of maximum accuracy at a predetermined point of the readings, say 650 ohms, corresponding to the requirements of some special manufacturing purpose.

Of course, the instrument may have its sensitiveness increased or diminished so as to give two or more scales by methods now used with the simple form of ohmmeter described in the preamble. Similarly the magnetic field can be shunted by a thumb screw adjustment as in the form previously described.

I claim:

1. An ohmmeter having a movable system comprising two windings, one of which forms part of a branch circuit of definite resistance, the other adapted to be connected in series with the unknown resistance to be measured, resilient means for controlling the position of said movable system, and means for producing a magnetic flux through said windings.

2. An ohmmeter having a movable system comprising two windings, one of which forms part of a branch circuit of definite resistance, the other adapted to be connected in series with the unknown resistance to be measured, said coils being wound and disposed to exactly balance the effects of one another on the movable system when the current divides between them in a certain relation, resilient means for opposing motion of the movable system away from a certain position, and means for producing a magnetic flux through said windings.

3. An ohmmeter having a movable system comprising two windings, one of which forms part of a branch circuit of definite resistance, the other adapted to be connected in series with the unknown resistance to be measured, means for connecting a battery to cause current to flow through such divided circuit, resilient means for controlling the position of said movable system, and means for producing a magnetic flux through said windings.

4. An ohmmeter having a movable system comprising two windings, one of which forms part of a branch circuit of definite resistance, the other adapted to be connected in series with the unknown resistance to be measured, said coils together producing a zero resultant magnetic torque when the unknown resistance is zero, resilient means for controlling the position of said movable system, and means for producing a magnetic flux through said windings.

5. An ohmmeter having a movable system comprising two windings, one of which forms part of a branch circuit of fixed or definite resistance, the other adapted to be connected in series with the unknown resistance to be measured, resilient means for maintaining the position of said movable system normally poised at zero resistance and yielding to permit the greatest movement thereof when the greatest resistance to be measured is so connected, and means for producing a magnetic flux through said winding.

6. An ohmmeter having a movable system comprising two windings, one of which forms part of a branch circuit of definite resistance, the other adapted to be connected in series with the unknown resistance to be measured, said coils being wound and related to one another to produce zero resultant magnetic torque on the movable system when said unknown resistance is zero, resilient means for maintaining the position of said movable system normally poised at zero resistance and yielding to permit the maximum movement thereof when the greatest resistance to be measured is so connected, and means for producing a magnetic flux through said windings.

7. An ohmmeter having a movable system comprising two windings, one of which forms part of a branch circuit of definite resistance, the other adapted to be connected in series with the unknown resistance to be measured, resilient means for controlling the position of said movable system, means for connecting a test resistance in place of the unknown resistance to be measured, and means for producing a magnetic flux through said windings.

8. An ohmmeter having a movable system comprising two windings, one of which forms part of a branch circuit of definite resistance, the other adapted to be connected in series with the unknown resistance to be measured, resilient means for controlling the position of said movable system, an additional fixed resistance, means for placing the additional fixed resistance in series with the unknown resistance to be measured, and means producing a magnetic flux through said windings.

9. An ohmmeter having a movable system comprising two windings, one of which forms part of a branch circuit of definite resistance, the other adapted to be connected in series with the unknown resistance to be measured, terminals by which a battery may be connected in such divided circuit, resilient means for controlling the position of said movable system, and means for producing a magnetic flux through said windings.

10. An ohmmeter having a movable coil in two sections, means establishing a single magnetic field in which the two sections of the coil exert equal and opposite torques for all angular positions of the coil within its limits of movement when the ampere turns of its branches are equal, and terminals connected to one of the sections across which a resistance to be measured can be bridged.

11. An ohmmeter having a movable coil in two sections, means establishing a single magnetic field in which the two sections of the coil exert equal and opposite torques when the ampere turns of its branches are equal, terminals connected to one of the sections across which the resistance to be measured can be bridged, and resilient means for controlling the position of the coil in its magnetic field.

12. An ohmmeter having a movable coil in two sections, means establishing a single magnetic field in which the two sections of the coil exert equal and opposite torques when the ampere turns of its branches are equal, terminals connected to one of the sections across which a resistance to be measured can be bridged, and resilient means for normally maintaining said coil in a definite position when no current is passing through said movable coil.

13. An ohmmeter having a movable coil in two sections having a fixed predetermined ratio of resistance, means establishing a single magnetic field in which the two sections exert equal and opposite torques when the ampere turns of the sections are equal, terminals connected to one of the sections across which a resistance to be measured can be bridged, and resilient means for normally maintaining said coil in a definite freely poised position when no current is passing through said movable coil.

14. An ohmmeter having a movable coil in two sections having a fixed predetermined ratio of resistance, means for establishing a single magnetic field in which the two sections exert equal and opposite torques on the coil when the ampere turns of the sections are equal, terminals connected to one of the sections across which a resistance to be measured can be bridged, and resilient means for normally maintaining said coil in a free zero position in said magnetic field.

15. An ohmmeter having a movable coil in two sections, means establishing a single magnetic field in which the coil is displaced when the ampere turns of the two sections are unequal, resilient means for controlling the position of the coil in the magnetic field, terminals in one of the sections across which a resistance to be measured can be bridged, and fixed resistances outside the coil but in the circuits of the respective sections thereof to assist in fixing the respective resistances of the sections.

16. An ohmmeter having a movable coil in two sections, means establishing a single magnetic field in which the coil is displaced when the ampere turns of the two sections are unequal, resilient means for controlling the position of the coil in the magnetic field, terminals for the application of a battery current giving a divided flow through both sections of said coil, measuring terminals in one of the sections across which a resistance to be measured can be bridged, and outside fixed resistances included in the circuits of the sections of said coil for fixing the resistance of said respective sections at any desired ratio.

17. An ohmmeter having a movable coil in two sections, means establishing a magnetic field in which the two sections of the coil exert equal and opposite torques when the ampere turns of the sections are balanced, terminals for the application of a battery current giving a divided flow through both branches of said coil, measuring terminals in one of the sections across which a resistance to be measured can be bridged, and a fixed known resistance corresponding to the upper limit of one of the ranges of the instrument adapted to be shunted across said measuring terminals.

In testimony whereof, I have hereunto subscribed my name.

BURCHARD P. ROMAIN.

Witnesses:
  ALFRED W. PROCTOR,
  ROXIE DOBSON.